United States Patent [19]

Hanisko

[11] 4,265,210

[45] May 5, 1981

[54] ELECTRIC CONTROL APPARATUS FOR INTERNAL COMBUSTION ENGINES

[75] Inventor: John C. P. Hanisko, Southfield, Mich.

[73] Assignee: The Bendix Corporation, Southfield, Mich.

[21] Appl. No.: 948,453

[22] Filed: Oct. 4, 1978

[51] Int. Cl.³ .............................................. F02D 5/02
[52] U.S. Cl. ................................... 123/490; 123/494; 123/476
[58] Field of Search ......... 123/32 EA, 148 E, 32 EB, 123/32 EC, 117 R, 117 D

[56] References Cited

U.S. PATENT DOCUMENTS

| | | | |
|---|---|---|---|
| 3,621,826 | 11/1971 | Chrestensen | 123/148 E |
| 3,719,177 | 3/1973 | Oishi et al. | 123/32 EA |
| 3,809,029 | 5/1974 | Wakamatsu et al. | 123/32 EA |
| 3,832,981 | 9/1974 | Wakamatsu et al. | 123/32 EA |

*Primary Examiner*—Charles J. Myhre
*Assistant Examiner*—Andrew M. Dolinar
*Attorney, Agent, or Firm*—Markell Seitzman; Russel C. Wells

[57] ABSTRACT

Electric control apparatus for providing an enabling control signal and a steering control signal to control the electronic fuel injectors of a sequential fuel injection system of an internal combustion engine is disclosed. The apparatus includes a rotatable disc which rotates in synchronism with the engine. The disc has a plurality of spaced sensible elements contained thereon, one of the sensible elements defining a reference element which has a recognizable characteristic distinguishing it from the other sensible elements. The distance between the reference element and an adjacent element defines a predetermined distance different than the distance between any two adjacent nonreference elements. A single sensor senses the spaced sensible elements and provides corresponding electrical pulses. A pulse processing circuit electrically connected to the output of the sensor processes the pulses. A comparing circuit of the pulse processing circuit compares the period of time a particular pulse is present within a variable time period with the variable time period. A comparing circuit of the pulse processing circuit provides an indication signal to indicate the presence of a reference pulse corresponding to the reference element within the selected variable time period. The pulse processing circuit utilizes the indication signal to provide the enabling control signal and the steering control signal.

9 Claims, 4 Drawing Figures

ELECTRIC CONTROL APPARATUS FOR INTERNAL COMBUSTION ENGINES

TECHNICAL FIELD

This invention relates to electric control apparatus for internal combustion engines and, more particularly, to a control apparatus for providing control signals containing timing and steering information to control the electronic fuel injectors of a sequential fuel injection system of an internal combustion engine.

BACKGROUND ART

In a sequential fuel injection system of an internal combustion engine the "trigger" or control signal will need to carry two types of information: (1) information to control the actual timing of injection and (2) information for the steering of the injection signal to the proper cylinder of th engine. In such a system, injection must be initiated after so many degrees of crankshaft rotation, for example, every 90° of cranshaft rotation in the case of a V8 engine.

The developed injection timing information must be steered to the proper cylinder in a sequential fuel injection system. This fact implies that the steering information must be related to the camshaft. Steering information would synchronize the injection pulse immediately following, for example, a steering pulse on a selected cylinder and a ring counter could distribute the following injection pulses to the proper injectors according to the engine's firing order.

The U.S. Pat. No. 3,809,029 of Wakamatsu et al., discloses an ignition and fuel injection timing system. Part of the system consists of a means of obtaining fuel injection timing information. One sensor is provided for each cylinder to obtain the fuel injection information. The circuit which controls the triggering of any one injector receives signals from two of the sensors. Sensible elements on a disc connected to the camshaft of the engine are sensed. The sensible elements include a reference element having a width different from the nonreference element. All of the elements are separated by equal spaces. The triggering of each individual injector is initiated by the passage of the reference element under the sensor associated with that injector. The nonreference elements function as countable items to obtain appropriate phase shifts in triggering. An electric integrator and a comparator produce a reference or sync pulse.

DISCLOSURE OF THE INVENTION

An object of the present invention is to provide an electric control apparatus for providing control signals containing timing and steering information to control electronic fuel injectors of a sequential fuel injection system of an internal combustion engine wherein synchronization and timing is provided with a single sensor.

Another object of this invention is to provide such an electric control apparatus for internal combustion engine having n cylinders and wherein the control apparatus includes a disc containing n+1 sensible elements the width and spacing of the sensed elements allowing for the synchronization and timing of the apparatus.

A further object of the invention is to provide such an electric control apparatus including a single sensor disposed in operative relationship with the rotating disc to sense the spaced sensible elements and wherein a relatively simple, inexpensive and reliable electronic pulse processing circuit extracts the synchronization and timing information from the disc to provide appropriate enabling and disenabling signals to injection actuation devices over a practical range of engine speeds.

Yet another object of the present invention is to provide an electric control apparatus including an electronic charge storage device having charge and discharge asymmetries from an arranged pulse-stream pattern provided by an automotive camshaft sensor and wherein a pulse processing circuit to the apparatus distinguishes these asymmetries to provide the necessary injection timing and steering information.

In carrying out the above objects and other objects of this invention, a preferred embodiment of the invention includes a pulse generating means for sequentially generating electrical output pulses throughout each cycle of the engine over a range of engine speeds in synchronism with the revolutions of the engine, the electrical pulses containing a reference pulse for each complete engine cycle. The apparatus also comprises a pulse processing means electrically connected to the output of the pulse generating means for processing the pulses. The pulse processing means includes a comparing means for comparing the period of time a selected pulse is present within a variable time period with the variable time period. The comparing means provides an indication signal indicating the detection of the reference pulse when the particular pulse comprises the reference pulse. The pulse processing means utilizes the indication signal to provide the control signals.

To further carry out the above objects of this invention, a preferred method of the invention includes rotating a member in synchronism with the engine, the member having a plurality of spaced sensible elements contained thereon. One of the sensible elements defines a reference element having a recognizable characteristic distinguishing it from the other sensible elements. The distance between the reference element and an adjacent element defines a predetermined distance different than the distance between any two adjacent nonreference elements. The method further includes the step of detecting the reference element in accordance with the recognizable characteristic and the predetermined distance, providing an indication signal upon detecting the reference element and utilizing the detection signal to provide the control signal.

The objects, features and advantages of the present invention are readily apparent from the following detailed description of the best mode taken in connection with the accompanying drawings.

BEST MODE FOR CARRYING OUT THE INVENTION

Figure 1:
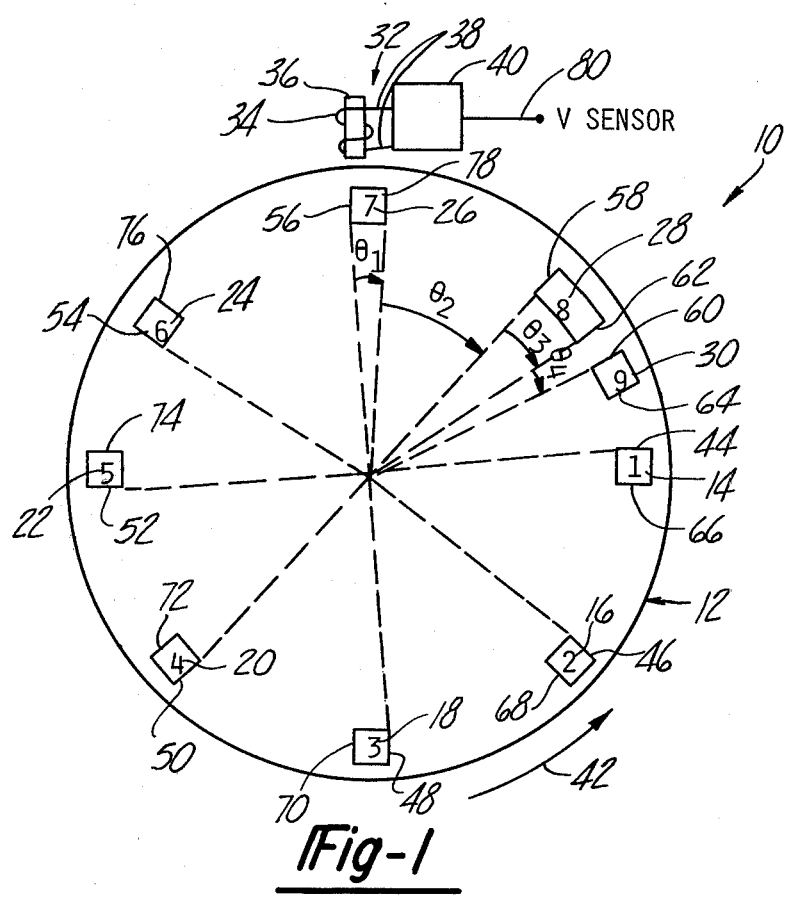
FIG. 1 is a schematic view showing a sensor and a disc having numbered sensible elements contained thereon, the size of the sensible elements being exaggerated for illustrative purposes.

Referring to FIG. 1, a pulse generating means or a pulse generating apparatus constructed according to the present invention is indicated collectively by reference numeral 10 and includes a rotatable member or disc generally indicated at 12 and nine consecutively numbered sensible elements 14, 16, 18, 20, 22, 24, 26, 28 and 30 for an 8-cylinder engine. The number on an element indicates the particular cylinder to be fired upon sensing that particular element except for element 9.

The disc 12 is adapted to be mechanically connected in a conventional fashion to an engine camshaft to rotate therewith. The sensible elements 14, 16, 18, 20, 22, 24, 26 and 30 have equal sensible geometries or, in other words, are geometrically substantially equal while the sensible element 28 comprises a reference element having a larger sensible geometry than the remaining sensible elements as will be described in greater detail hereinafter.

A single sensor, generally indicated at 32, is disposed immediately adjacent the periphery of the disc 12 to sense the spaced sensible elements 14 through 30. The sensor may comprise a Hall-effect sensor, or an optoelectronic sensor or any other sensing device depending on the type of sensible elements employed. However, the invention will be described hereinafter with reference to the sensor 32.

One complete revolution of the disc 12 presents each sensible element 14 through 30 to the sensor 32 one time. Sensible element 14 through 30 may comprise ferrous metal portions fixedly secured to the disc 12 such as by adhesive bonding or the like. The disc 12 may comprise a nonferrous metal or plastic element so as not to be sensible to the sensor 32.

Figure 2:
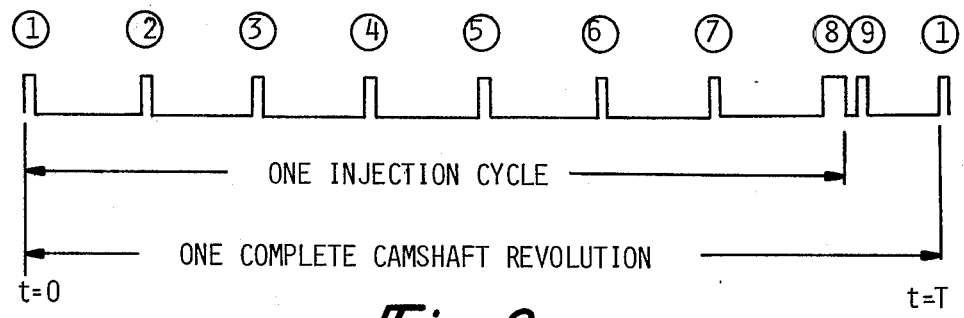
FIG. 2 is a simplified timing diagram showing voltage pulses generated by the sensor of FIG. 1 upon rotation of the disc.

The sensor 32 includes a coil 34 wound about a permanent magnet 36 to produce a magnetic field thereabout. Terminals 38 of the coil 34 are electrically connected to a conventional wave shaping and amplifier circuit 40 which may include a Schmidt trigger circuit to form the pulses as shown in FIG. 2 upon rotation of the sensible elements 14 through 30 through the magnetic field.

The disc 12 rotates in a counterclockwise direction as indicated by the arrow 42 in FIG. 1. The leading edges 44, 48, 50, 52, 54, 56, 58 and 60 of the sensible elements 14 through 30 are located in a plane perpendicular to the direction of rotation indicated by the arrow 42 and are the first part of the sensible elements 14 through 30 which pass into the magnetic field created by the permanent magnet 36. The leading edges 44 through 58 of the sensible elements 14 through 28 are equally spaced every 45° about the circumference of the disc 12 and correspond to the number of injectors or cylinders in the fuel injection system. The leading edge 60 of the sensible element 30 is spaced an appropriate distance (in this case 5°) from the trailing edge 62 of the sensible element 28. The trailing edges 64, 66, 68, 70, 72, 74, 76, 78 and 62 of the sensible elements 30, 14, 16, 18, 20, 22, 24, 26, and 28 respectively, are the last part of their corresponding sensible elements to leave the magnetic field created by the permanent magnet 36 and are also located in a plane perpendicular to the direction of rotation 42.

As previously noted, the sensible elements 14, 16, 18, 20, 22, 24, and 30 have equal sensible geometries. The mechanical angles or widths between their corresponding leading edges and their corresponding trailing edges all equal 1° (i.e. $\theta_1$). The widths of all of the sensible elements are greatly exaggerated as shown in FIG. 1 for illustrative purposes.

Also, as previously noted, the leading edges of the elements 14, 16, 18, 20, 22, 24, 26 and 28 are equally spaced about the circumference of the disc 12 every 45°. Therefore, the angle, $\theta_2$, between the trailing edge 78 of the sensible element 26 and the leading edge 58 of the sensible element 28 equals 44°.

The width, $\theta_3$, of the sensible element 28 expressed in degrees is 10° between the leading edge 58 and the trailing edge 62 of the element 28. The angle between the trailing edge 62 of the sensible element 28 and the leading edge 60 of the sensible element 30 is equal to $\theta_4$ which in this case equal 5°.

With reference to FIG. 2 voltage pulses are generated at the output terminal 80 of the circuitry 40 when the disc 12 rotates past the sensor 32. The output pulses of the first eight sensible elements 14 through 28 are shown as indicated for one injection cycle and also for one complete camshaft revolution with the inclusion of the output voltage pulse generated from the sensing of the ninth sensible element 30. One injection cycle is defined to equal the total time from the leading edge of sensor pulse #1 to the trailing edge of sensor pulse #8.

This time duration of each of the voltage pulses shown in FIG. 2 is inversely proportional to engine speed (i.e. camshaft angular speed) and is directly proportional to sensible element geometry (i.e. physical width W of each of sensed elements 14 through 30). The physical width W is a dimension which is colinear to the direction of rotation 42 of the camshaft. As shown in FIG. 2, the width of each of the pulses 1 through 9 are substantially equal to each other except for the width of pulse 8 which corresponds to the reference element 28 and thereby defines a reference pulse.

Figure 3:
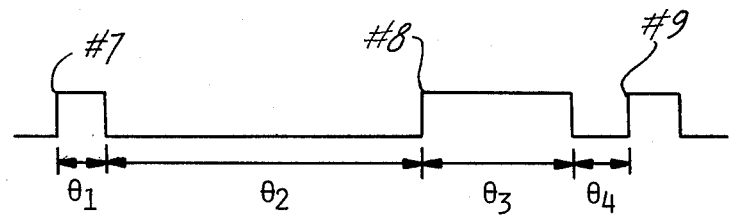
FIG. 3 is an enlarged view of a portion of FIG. 2, not to scale, shown for illustrative purposes.

With reference to FIG. 3, the portion of FIG. 2 containing the pulses seven, eight, and nine has been blown up to show the relationship of the angles $\theta_1$, $\theta_2$, $\theta_3$, and $\theta_4$ to the generated pulses seven, eight, and nine.

Figure 4:
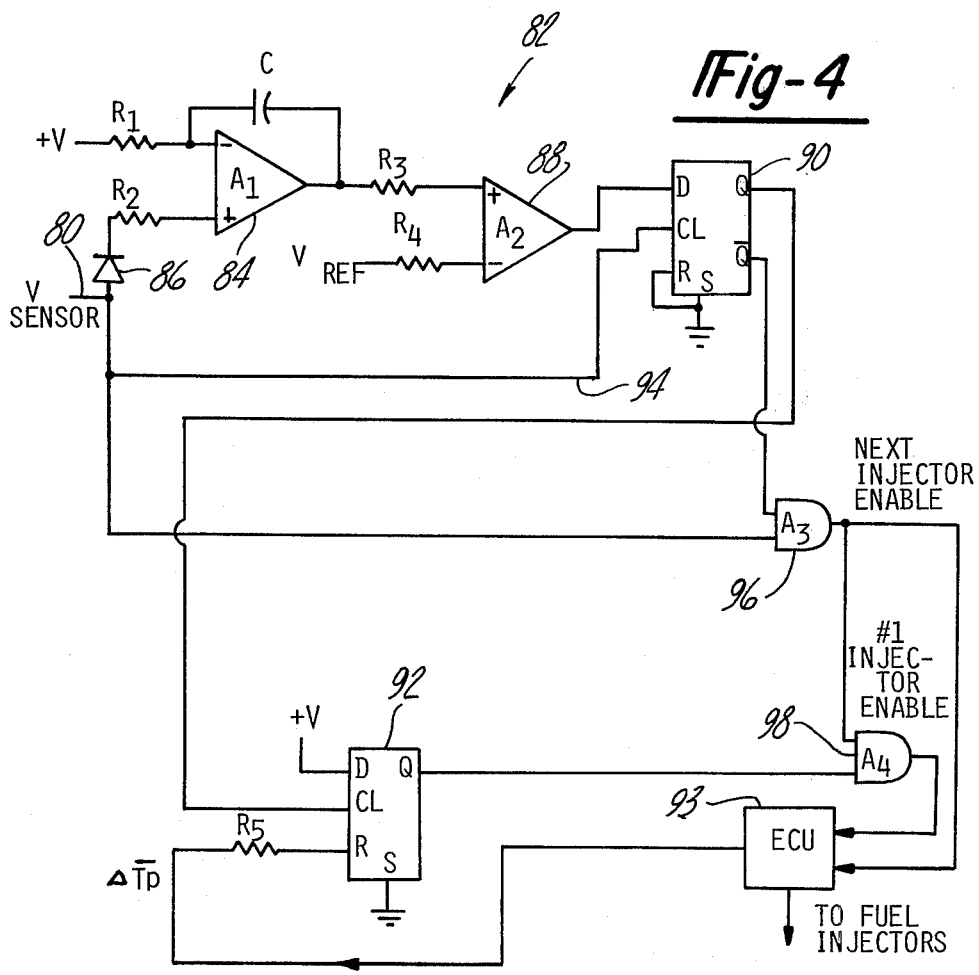
FIG. 4 is a circuit diagram of a pulse processing circuit of this invention.

With reference to FIG. 4, the apparatus further includes a pulse processing means or a pulse processing circuit generally indicated at 82. The pulse processing circuit 82 is electrically connected to the output terminal 80 of the circuit 40 and processes the pulses thereon. The pulse processing circuit 82 includes a current differencing operational amplifier which is connected in the circuit 82 as an integrator 84 to charge a capacitor, C, upon the occurrence of a pulse. A rectifying diode 86 is connected to the non-inverting input of the integrator 84 through a resistor $R_2$. The capacitor, C, is connected in parallel across the inverting input and the output of the integrator 84 to be charged thereby. Also connected to the inverting input of the integrator 84 is a positive reference voltage through a resistor $R_1$. The resistors $R_1$ and $R_2$ and the capacitor, C, are chosen so that the only pulse-to-pulse time period which produces a net charge on the capacitor, C, exceeding a reference voltage, $V_{ref}$, is that period which begins with the leading edge of pulse eight and ends with the leading edge of pulse nine over an extended range of engine speeds, i.e., 50–4500 RPM.

The output of the integrator 84 is connected through a one megohm resistor $R_3$ to the positive input of an operational amplifier which is connected as a comparator 88 in the circuit 82. The inverting input of the comparator 88 is connected to the reference voltage $V_{ref}$ through a one megohm resistor $R_4$. The comparator 88 compares the voltage appearing at the output of the integrator 84 with the reference voltage, $V_{ref}$.

The output of the comparator 88 is connected to the D input of a D flip-flop 90. The output Q of the D flip-flop 90 is used to clock a second D flip-flop 92 whose D input is biased by a positive voltage and whose reset input is connected to a signal, $\Delta \overline{T}_p$ through a resistor $R_5$. $\Delta \overline{T}_p$ represents the differentiated inverse signal of the #1 fuel injector pulse signal generated by an electronic control unit 93 (ECU) which also sends fuel injector pulse signals to the fuel injectors to thereby actuate the fuel injections in a conventional fashion. The resistor $R_5$ is included for delay purposes in resetting the second flip-flop 92 on the signal $\Delta \overline{T}_p$ which corresponds to the trailing edge of the signal $T_p$ for injector #1.

Pulses appearing on the output terminal 80 are also used to clock the first flip-flop 90 along a lead line 94 and also serve as one input to an AND gate 96. The other input of the AND gate 96 is connected to the $\overline{Q}$ output of the flip-flop 90. The output of the AND gate 96 defines a next-injector-enable signal or an enabling control signal. The output of the AND gate 96 is connected as one input to a second AND gate 98. The output of the second AND gate 98 is connected to the Q output of the second flip-flop 92 to obtain a #1 injector enable signal or a steering control signal for directing the enabling control signal to control the drive circuit of a predetermined fuel injector which, in the present case, is the #1 fuel injector.

Both of the control signals are connected as inputs to the electronic control unit 93. From the control signals the electronic control unit 93 controls which fuel injector is to be actuated and when this actuation takes place. The electronic control unit 93 may include a ring counter (not shown) which is incremented by the enabling control signal to distribute the injection pulses to the proper injectors according to the engine's firing order until the occurrence of the steering control signal which provides the steering information to steer the next fuel injection.

In general, the capacitor, C, comprises a charge storage device which charges when a sensor voltage pulse is present and discharges when a sensor voltage pulse is absent. The residual charge left on the capacitor C from a previous charge-discharge event is tested on the leading edge of the following pulse. If the residual charge is less than a voltage reference, the next injector in sequence is enabled by the next injector enable signal through the electronic control unit 93. If the residual charge is greater than the voltage reference, the next injector is disabled and injector #1 is enabled through the electronic control unit 93 as over the required speed range (i.e. 50–4500 RPM).

CIRCUIT OPERATION

The occurrence of a pulse at output terminal 80 causes the integrator 84 to begin to charge capacitor C. The pulse also clocks the output of the comparator 88 to the Q output of the flip-flop 90. If the net charge produced by the immediately previous charge and discharge events is less than the voltage reference $V_{ref}$ the Q output of the flip-flop 90 is 0 or low. As a result, the second flip-flop 92 will not be clocked and thus injector #1 would not be enabled. Furthermore, the $\overline{Q}$ output of the first flip-flop 90 is high and together with the high output on the output terminal 80 causes the AND gate 96 to enable the next injector in sequence. On the other hand, if the immediately previous charge and discharge events have produced a residual charge which exceeds the voltage reference $V_{ref}$ (i.e. only when the previous pulse is the reference pulse) the Q output of the flip-flop 90 goes high thereby clocking the Q output of the second flip-flop 92 to address one input of the AND gate 98. The fact that the $\overline{Q}$ output with the first flip-flop 90 has gone low or to 0 prevents the first AND gate 96 from triggering an injector erroneously on the #9 pulse in the cycle. When the #1 pulse of the subsequent injection cycle occurs, the output of the integrator 84 will be less than $V_{ref}$. This will cause the AND gate 96 to go high or to 1 thereby enabling the next injector in the sequence and addressing the second input of the AND gate 98. Because both of the inputs to the AND gate 98 are addressed or high, the output of the AND gate 98 will go high thus steering the enabling output of the AND gate 96 to the #1 injector. The second flip-flop 92 is reset by the trailing edge of the injector pulse signal $T_p$ through $R_5$ which introduces a small time delay to the resetting of the second flip-flop 92.

While preferred embodiment of the electric control apparatus has been shown and described herein in detail, those skilled in this art will recognize various alternative designs and embodiments for practising the present invention as defined by the following claims.

What is claimed is:

1. An electric control apparatus for providing control signals containing timing and steering information to control electronic fuel injectors of a sequential fuel injection system of an internal combustion engine, said apparatus comprising;
    pulse generating means for sequentially generating electrical output pulses throughout each cycle of the engine over a range of engine speeds in synchronism with the revolutions of the engine, said electrical pulses containing a reference pulse for each complete engine cycle,
    wherein said pulse generating means includes a rotatable member operatively associated with said engine to rotate in synchronism therewith and having a plurality of spaced sensible elements contained thereon, one of said sensible elements defining a reference element corresponding to said reference pulse and having a recognizable characteristic distinguishing it from the other sensible elements, the distance between said reference element and an adjacent element defining a predetermined distance different than the distance between any two adjacent nonreference elements, and wherein said pulse generating means further includes a single sensor disposed in operative relationship with said rotating member for sensing said spaced sensible elements and providing said electrical output pulses, said pulse processing means detecting said reference pulse in accordance with said recognizable characteristic and the predetermined distance, and
    pulse processing means electrically connected to the output of said pulse generating means for processing said pulses, said pulse processing means including comparing means for generating a plurality of first signals indicative of the period of time a particular pulse is present within a variable time period with a second signal indicative of said variable time period and for comparing said first signal with said second signal, said comparing means providing an indication signal indicating the detection of said reference pulse based on said comparison, said particular pulse comprises said reference pulse and said pulse processing means utilizing said indication signal to provide said control signals.

2. The apparatus as claimed in claim 1, wherein said pulse processing means includes a charge storage device, each of said pulses charging the storage device to a variable value, the storage device discharging in the absence of said pulses, and wherein the storage device discharges to a value greater than a predetermined reference value after said variable time period in which said reference pulse is present over said range of engine speeds.

3. The apparatus as claimed in claim 2, wherein said comparing means includes an electric comparator for comparing the charge value of said storage device with said predetermined reference value, the time between said reference pulse and the immediately following pulse being insufficient to discharge the storage device below the predetermined reference value, and wherein said pulse processing means includes an indicator means responsive to said generated pulses and having an input connected to the output of said comparator for indicating the occurrence of said reference pulse.

4. The apparatus as claimed in claim 3, wherein said pulse processing means includes circuit means responsive to a generated pulse and to a negative indication of an immediately preceding reference pulse by said indicator means to provide an enabling control signal.

5. The apparatus as claimed in claim 4, wherein each fuel injector has associated with it a drive circuit and wherein said pulse processing means further includes a second circuit means responsive to said enabling control signal and to preceding positive indication of said reference signal by said indicator means to provide a steering control signal for directing said enabling signal to the drive circuit of a particular fuel injector.

6. An electric control apparatus providing control signals containing timing and steering information to control electronic fuel injectors of a sequential fuel injection system of an internal combustion engine said apparatus comprising;
a rotatable member operatively associated with said engine to rotate in synchronism therewith and having a plurality of spaced sensible elements contained thereon, one of said sensible elements defining a reference element having a recognizable characteristic distinguishing it from the other sensible elements, the distance between said reference element and an adjacent element defining a predetermined distance different from the distance between any two adjacent nonreference elements, and
control means, including a single sensor disposed in operative relationship with said rotating member to sense said spaced sensible elements, for detecting said reference element in accordance with said recognizable characteristic and the predetermined distance over a range of engine speeds, said control means utilizing said detected reference element to provide said control signals.

7. The apparatus as claimed in claim 6, wherein said sensor provides electrical output pulses upon sensing said spaced sensible elements and wherein said control means further includes pulse processing means electrically connected to the output of said sensor for processing said pulses, said pulse processing means including comparing means for generating a plurality of first signals indicative of the period of time a particular pulse is present within a variable time period with a second signal indicative of said variable time period and for comparing said first signal with said second signal, said comparing means providing and indicating the detection of said reference pulse based on said comparison, said particular pulse comprises a reference pulse corresponding to said reference element and said pulse processing means utilizing said indication signal to provide said control signals.

8. A method for providing control signals containing timing and steering information to control electronic fuel injectors of a sequential fuel injection system of an internal combustion engine, said method comprising the steps of:
rotating a member in synchronism with the engine, the member having a plurality of spaced sensible elements contained thereon, one of the sensible elements defining a reference element having a recognizable characteristic distinguishing it from the other sensible elements, the distance between the reference element and an adjacent element defining a predetermined distance different from the distance between any two adjacent nonreference elements,
detecting the reference element in accordance with the recognizable characteristic and the predetermined distance,
providing an indication signal upon detecting said reference element, and
utilizing said indication signal to provide said control signals.

9. A method of providing control signals containing timing and steering information to control electronic fuel injectors of a sequential fuel injection system of an internal combustion engine, said method comprising the steps of:
rotating a member in synchronism with the engine, the member having a plurality of spaced sensible elements contained thereon, one of the sensible elements defining a reference element having a recognizable characteristic distinguishing it from the other sensible elements, the distance between the referenced element and an adjacent element determining a predetermined distance different from the distance between any two adjacent non-referenced elements;
generating a plurality of electrical output pulses in synchronism with the revolutions of the engine in response to said sensible elements, one of the pulses within a complete engine cycle comprising a reference pulse corresponding to the recognizable characteristic and predetermined distance,
generating a signal indicative of a variable time period;
generating a plurality of first signals indicative of the period of time a particular pulse is present within said variable time period;
comparing said plurality of first signals with said signal indicative of a variable time period; and
providing an indication signal after making said comparison and
utilizing said indication signal and said output pulses to indicate the detection of said reference pulse to obtain control signals containing the desired timing and steering information.

* * * * *